United States Patent [19]

Bachmat

[11] Patent Number: 6,122,685
[45] Date of Patent: Sep. 19, 2000

[54] SYSTEM FOR IMPROVING THE PERFORMANCE OF A DISK STORAGE DEVICE BY RECONFIGURING A LOGICAL VOLUME OF DATA IN RESPONSE TO THE TYPE OF OPERATIONS BEING PERFORMED

[75] Inventor: Eitan Bachmat, Hopkinton, Mass.

[73] Assignee: EMC Corporation, Hopkinton, Mass.

[21] Appl. No.: 09/073,714

[22] Filed: May 6, 1998

[51] Int. Cl.[7] ................................................... G06F 13/14
[52] U.S. Cl. ............................. 710/74; 710/18; 710/31; 711/113; 712/36
[58] Field of Search .................... 710/18, 25, 31, 710/16, 20, 74; 711/117, 119, 113, 129; 709/302; 712/36

[56] References Cited

U.S. PATENT DOCUMENTS

| 5,136,707 | 8/1992 | Block et al. ............................... 395/600 |
| 5,261,080 | 11/1993 | Khoyi et al. .............................. 395/500 |
| 5,506,986 | 4/1996 | Healy ....................................... 395/600 |
| 5,592,640 | 1/1997 | Minoura et al. .......................... 395/428 |
| 5,708,650 | 1/1998 | Nakashima et al. ................... 369/275.3 |
| 5,708,769 | 1/1998 | Stallmo ................................ 395/182.04 |
| 5,719,918 | 2/1998 | Serbetciouglu et al. .................. 379/58 |
| 5,778,227 | 7/1998 | Jordan ...................................... 709/302 |
| 5,893,139 | 4/1999 | Kamiyama ............................... 711/117 |
| 5,923,384 | 7/1999 | Enomoto et al. ........................ 348/705 |
| 5,940,438 | 8/1999 | Poon et al. ............................... 375/222 |

*Primary Examiner*—Thomas C. Lee
*Assistant Examiner*—Twanna Gossom
*Attorney, Agent, or Firm*—George A. Herbster; Pearson & Pearson

[57] ABSTRACT

A method and apparatus for reconfiguring a file or logical volume stored on a magnetic disk storage system for optimal performance. The magnetic disk storage system contains a cache volume constituted as free storage. When appropriate, a file can be copied from its normal storage location to the cache volume with a different format to optimize the file for subsequent operations. After such operations are complete, the file can be transferred from the cache volume back to the normal storage location in the original format.

24 Claims, 6 Drawing Sheets

SYSTEM FOR IMPROVING THE PERFORMANCE OF A DISK STORAGE DEVICE BY RECONFIGURING A LOGICAL VOLUME OF DATA IN RESPONSE TO THE TYPE OF OPERATIONS BEING PERFORMED

CROSS REFERENCE TO RELATED APPLICATION

Reference is made to application for U.S. Ser. No. 08/842,953 still pending to filed Apr. 25, 1997 Method and Apparatus for Independent and Simultaneous Access to a Common Data Set which application is assigned to the same assignee as this invention.

BACKGROUND OF THE INVENTION

1. Field of the Invention

This invention generally relates to data processing systems and more specifically to a method and apparatus for enhancing the performance of magnetic storage devices under different operating conditions.

2. Description of Related Art

Data storage devices useful in digital data processing systems generally fall into different media categories. These categories can be ranked in terms of slowest to fastest response times as: (1) magnetic tape storage units; (2) optical storage units; (3) magnetic disk storage devices; and (4) digital random access memory (DRAM) storage devices. System administrators allocate different ones of these data storage devices or resources depending upon their relevance to a particular application.

Devices within a media category can also have different response times. This is particularly true with magnetic disk storage devices. In some situations the differences are a matter of mechanical and electronic design. For example, a smaller physical disk may have better performance than a larger physical disk due to reduced rotational latency in the smaller physical disk. Even within a common design, performance differences can be observed based upon file formatting or file structure. For example, monitored performance during reading operations may be reduced in a striped format versus a non-striped format because overlapping seek operations can be performed in a striped format. The performance in a mirrored system may be less favorable than in a non-mirrored system. In other redundant storage systems, access to data in a parity-based format may be degraded compared to access to data in a non-parity format.

In still other applications, a single physical magnetic disk storage unit or volume may contain multiple logical volumes. Such physical volumes are often called "hypered" volumes. In certain applications a non-hypered volume may exhibit better performance than a hypered volume, as when different applications make simultaneous accesses to the multiple logical volumes on a single physical volume. A log structured file format stores data in random, noncontiguous blocks on one or more physical disks.

A particular file, that is an application program or a related data file, may be stored in accordance with any of the foregoing formats or some combination thereof. For example, a logical volume may be stored in either a non-hypered, striped format or as a non-hypered, non-striped format.

Often times applications access data from locations sequentially. That is, an application may read or write data from or to a number of storage locations in sequence. With larger logical volumes this may involve transfers to or from a plurality of storage tracks in succession. In such operations attempts to read data in a logical volume with a log structured format produces the slowest response time. Conversely, if write operations are to random locations optimal performance may be achieved by storing the data in a log structured format.

With all the foregoing available diverse formats, it is difficult to predict which of these formats will produce the best overall performance. Typically, however, a system administrator uses a priori knowledge about anticipated operations to select one specific format. Hence the file or volume is optimized for the most likely operations, but will run sub-optimally for other operations. For example, if it is believed that random write operations will be the predominant mode of operation, a system administrator might select a log structured file format or a striped parity file format. However, if there are intervals at which sequential accesses will be encountered, the systems will run sub-optimally with respect, for example, to a mirrored, non-striped format. Notwithstanding this disadvantage, this continues to be the method by which the selection of a format for an individual logical volume or file is made.

SUMMARY

Therefore it is an object of this invention to provide a method and apparatus for improving the performance of storage devices in which data can be stored and processed according to different formats.

Another object of this invention is to provide a method and apparatus for enhancing the performance of a magnetic disk storage device that is capable of storing data in different formats.

Yet another object of this invention is to provide a method and apparatus that enables the data stored on a magnetic disk storage device to be processed in accordance with different formats according to particular requirements of an application.

The above and further objects and advantages are obtained in accordance with this invention by storing data in a first data block according to a first of a plurality of possible formats for operating in response to data transfer requests. A second data block is established for storing data in a second format. When a need for processing data in the second format exists, a copy of the data in the first format is transferred from the first data block to the second data block in the second format. Thereafter data transfer requests are directed to the second data block.

In accordance with another aspect of this invention, the performance of a data processing system comprises a first storage element of a given medium configured to store data according to a first format is improved by establishing a second storage element. The second storage element of the given medium has storage adapted to be configured according to a second format. In response to a predetermined event data from the first storage element is transferred to the second storage element to be stored in the second format.

In accordance with another aspect of this invention, the performance of the magnetic disk storage system that stores data in logical volumes is improved. The magnetic disk storage system stores a first logical volume of a predetermined size with a first of a plurality of possible formats and operates in response to data transfer requests in a first application. Performance is enhanced by establishing a second logical volume of a least a predetermined size for storing the data. Conditions are monitored to determine a time when a second application will process the data wherein performance of the second application would be enhanced if the data were stored in a second format. When that condition exists, data is copied from the first logical volume to a second logical volume in the second format. Thereafter data transfer requests generated by the second application are directed to the second logical volume.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
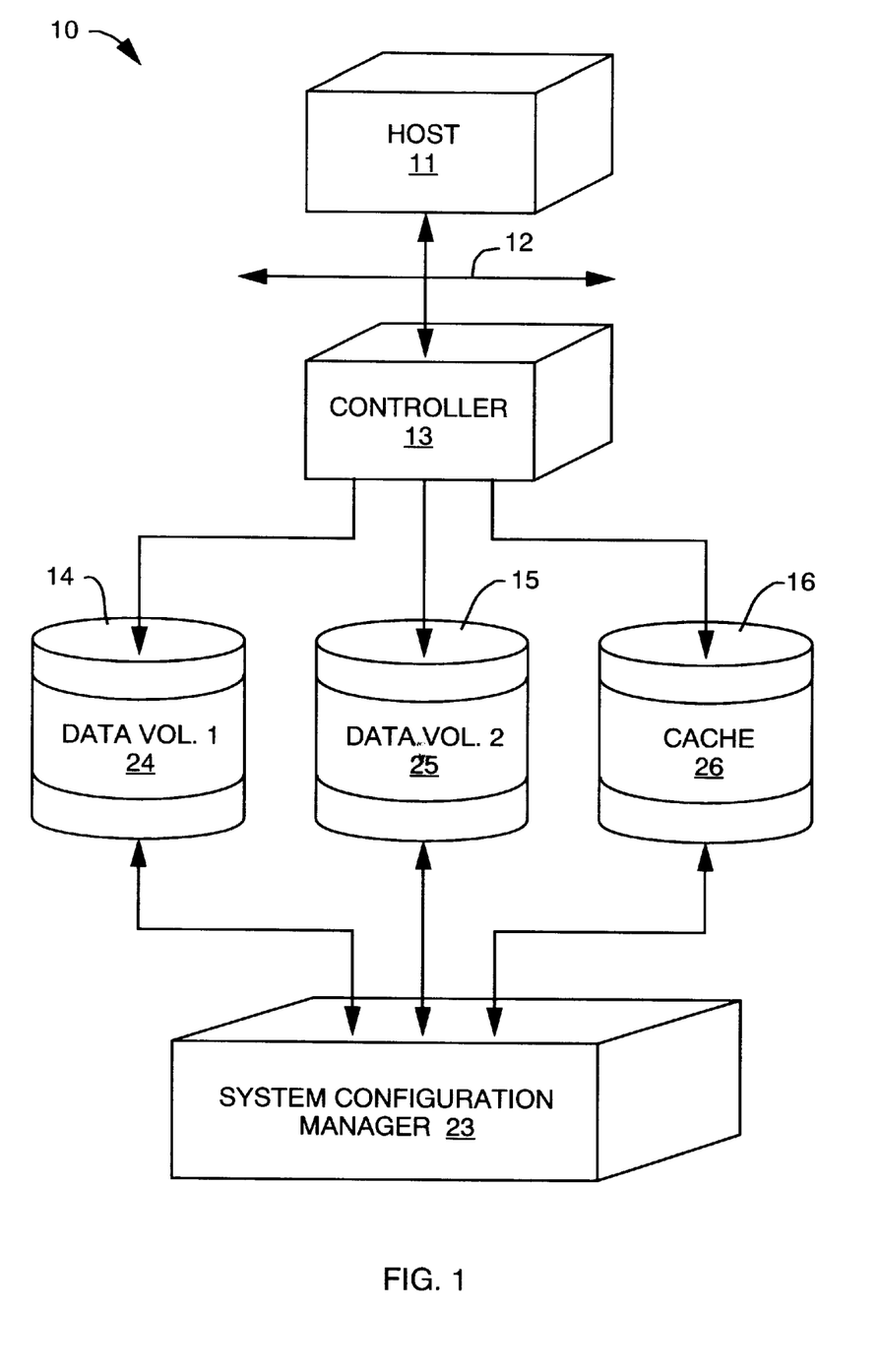
FIG. 1 is a block diagram useful in understanding the underlying concepts of this invention.

FIG. 1 is a functional diagram of a generic data processing system 10. The system includes a host 11 that connects through a bus 12 to a storage device controller 13. The controller 13 controls a plurality of storage devices, shown in FIG. 1 as physical disk storage devices 14, 15 and 16.

Although FIG. 1 depicts a single controller 13 for all three physical disk drives 14, 15, and 16, other data processing systems might comprise multiple controllers. It will also be apparent that a data processing system may include fewer or more physical disk drives. This particular configuration is shown to illustrate a path between the host and the physical disk drives. Control over the configuration and other operating aspects of the physical disk drives 14, 15 and 16 is achieved through a system configuration manager 23 that establishes another path to these drives. Such system configuration managers and their connection to physical disk drives are well known in the art.

Each of the physical disk storage devices 14, 15 and 16 may contain a single file or logical volume or may contain more than one logical volume. Moreover, a logical volume may, in certain applications, span multiple physical disk storage devices. In FIG. 1 a DATA VOL 1 logical volume 24 is shown as occupying a portion of the physical disk storage device 14; a DATA VOL 2 logical volume 25, of the physical disk storage device 15. Each of these physical disk storage devices 14, 15 and 16 may contain other logical volumes. Each transferable unit may be a file or logical volume. In the following discussion these units are also called "data blocks and "storage elements".

In accordance with this invention, however, at least one of the physical disk storage devices has an area of empty storage, that is, an empty logical volume, data block or storage element. In FIG. 1 this area is designated as a cache volume 26 on the physical disk storage device 16. Basically, and in accordance with this invention, the system configuration manager 23 includes various mechanisms for determining whether changing the format of the contents of a logical volume, such as the DATA VOL 1 and DATA VOL 2 logical volumes 24 and 25, would improve performance. When this occurs, the system configuration manager 23 causes the data to be copied to the cache volume 26 with a new format. This transfer may occur independently of and in parallel with the generation of transfer requests from the host 11.

For example, if DATA VOL 1 logical volume 24 contains a log structured file and an application is to begin processing that logical volume with a series of sequential read or write operations, the system configuration manager 23 could determine that performance could be enhanced if the contents of the logical volume 24 were stored in a non-striped, non-mirrored format. The system configuration manager 23 then would cause the contents of the logical volume or any designated portion thereof to be copied in sequence from the random locations of the structured file into successive locations in the cache volume 26 before the processing began. When the transfer is completed, the system configuration manager 23 would cause the controller 13 to reroute requests for the DATA VOL 1 logical volume 24 to the cache volume 26 whereupon the operation with sequential access is enhanced. When the need no longer exists, as when the non-striped format will no longer provide optimal performance, the system configuration manager 23 transfers the data in the cache volume 26 back to DATA VOL 1 logical volume 24 to be stored as a log structured file.

From this broad description it will be apparent that this invention enables the selection of an event. The event can be scheduled on the basis of time or on the basis of any other monitored parameter. If reconfiguration will improve the performance, the system configuration manager 23 transfers the data in a first format to the cache volume 26 as a second data block for storage in a second format that will enhance the operation. Although FIG. 1 depicts the cache logical volume 26 in a separate physical disk, the transfer can be between logical volumes or data blocks on the same or on different physical disks. All of this can occur in a manner that is transparent to the host 11.

Figure 2:
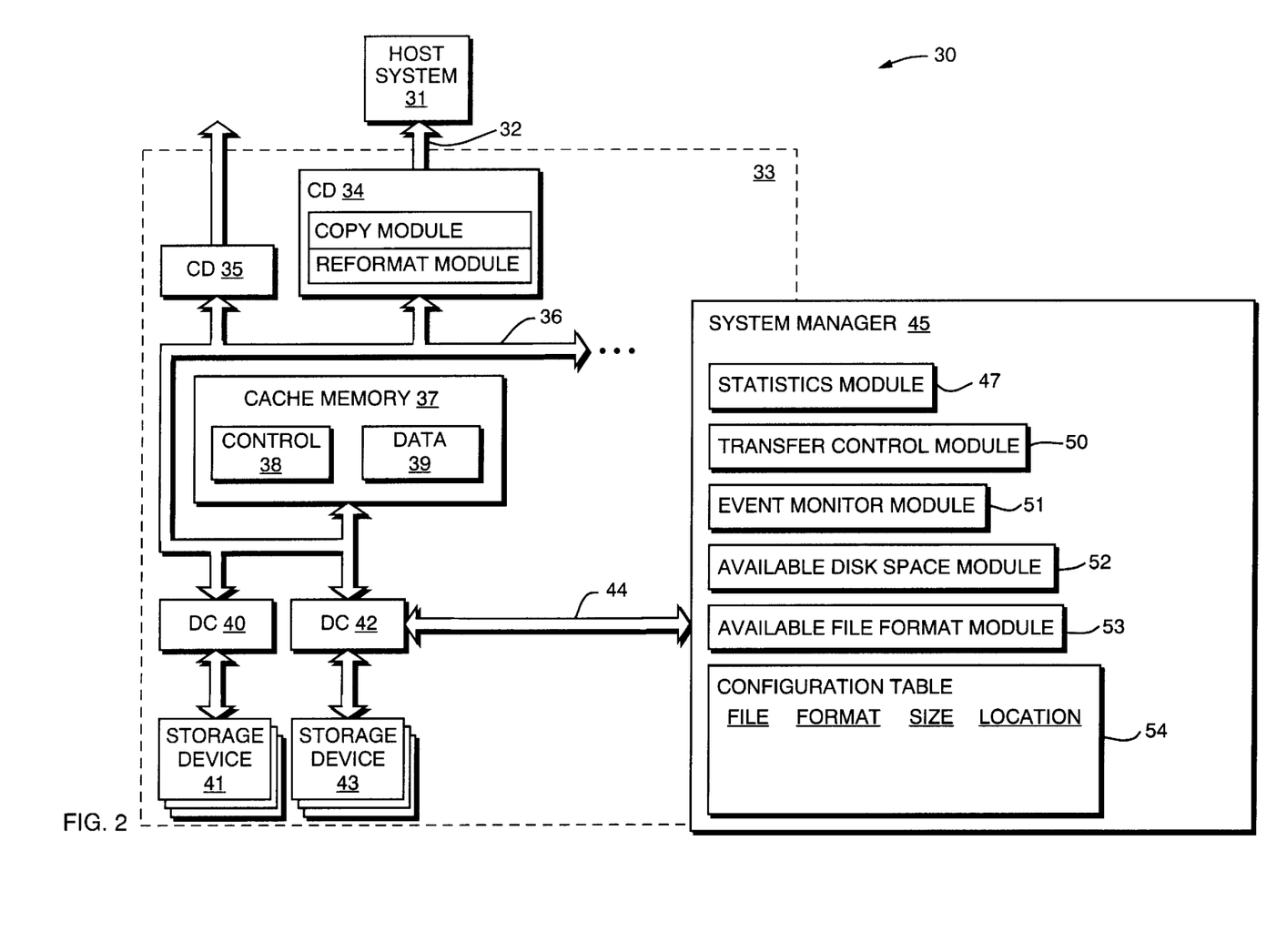
FIG. 2 depicts one embodiment of a data processing system incorporating this invention.

With this background it will be helpful to describe specific embodiments in the context of a particular magnetic disk storage system. Particularly FIG. 2 depicts a data processing system 30 with a host system 31 that may comprise one or more central processors. A bus 32 interconnects the host system 31 and a magnetic disk storage system 33. The host system 31 and bus 32 may also connect to additional magnetic disk storage systems.

There are a variety of magnetic disk storage systems that are useful in connection with this invention. The following description defines the magnetic disk storage system 33 in terms of the architecture of a Symmetrix Series 5500 magnetic disk storage system available from the assignee of the present invention. In such a system, channel directors 34 and 35 interface to buses, like bus 32 from the host 31. In this particular embodiment a channel director 34 connects to the bus 32. A channel director 35 is available for connection to still other host systems or the like.

The channel directors 34 and 35 within a single magnetic disk storage system 33 communicate with other elements of the system 33 over a bus 36 that may be a single or parallel bus. In the Symmetrix system one of those elements is a cache memory 37 that receives all requests for the magnetic disk storage memory 33 from the host system 31 or other host systems. This cache memory 37 contains control information and data stored in locations represented by a control block 38 and data block 39. The control information includes configuration and other information that enables a transfer request to be routed to an appropriate location.

The bus 36 also connects through device controllers to physical storage devices. In FIG. 2 a device controller 40 connects to a plurality of physical disk drives or physical volumes 41; and a device controller 42, to a plurality of physical disk drives or physical volumes 43. As known, when a host system, such as host system 31, issues a READ request, the controls associated with the magnetic disk storage system 33 first determine whether the data is in the data block 39. If it is, the data transfers directly to the host system 31 and there is no access to the physical volumes 41 or 43. If the data is not available, the data is retrieved from the appropriate ones of the physical volumes 41 and 43 into the data block 39 and then to the host system 31. When a host system, such as the host system 31, issues a WRITE request, the data initially transfers to the data block 39 where the request is staged to be transferred to a designated location in one of the physical volumes 41 and 43.

Information in the control block 38 includes configuration information that is supplied to the control block 38 through a bus 44 connected to one of the device controllers such as device controller 42 from a system manager 45. The system manager 45 performs other functions. For example, a statistics module 47 monitors the operations of the system to amass various statistics including the number of read and write operations and the nature and time of the read and write operations. Specifically, the statistics module 47 has the capability of determining whether various read and write operations occur with respect to random locations or to sequential locations within the physical volumes 41 and 43 on either a physical volume or logical volume basis.

In this particular embodiment, this invention can be realized by adding other modules to the system manager 45. A transfer control module 50, as described later, controls all processing required by this invention. The transfer control module 50 receives information from an event monitor module 51, available disk cache module 52 and available file format module 53. A configuration table 54 contains information concerning file identification, format, file size and location within the physical volumes 41 and 43.

More specifically, the event monitor module 51 can utilize information from the statistics module 47 or other sources to announce or define various events. The nature of these events can be quite diverse. A simple event is a date-time event. That is, if the system administrator knows that this invention should be implemented at a particular time, the event monitor module 51 will monitor a clock to initiate an operation at the particular time. A more complex event might be defined by dynamic file criteria, such as a monitored change in a pattern of access.

The available disk cache module 52 identifies different areas or logical volumes in the physical volumes 41 and 43 that can be utilized as cache volumes by this invention. Typically a magnetic disk storage system 33 as shown in FIG. 2 will not be utilized to 100% of its storage capacity. Free space within the physical volumes 41 and 43 then can be used to form one or more cache volumes. Obviously the size of any cache volume limits the size of the file or data set that can be transferred to it. Thus the module 52 may merely contain the location of cache volumes of a minimum size or the location of each cache volume and its capacity. Alternatively the function of the module 52 might be contained in the configuration table 54 or might contain an identification of selected cache volumes for each file or logical volume. Such identifications may be assigned on a static or dynamic basis.

File structures or formats vary, as previously indicated. The available file format module 53 lists all the file formats that can be used. This may include all the previously described file formats, some subset of these formats or even additional formats.

Although FIG. 2 depicts three distinct modules 51, 52 and 53, in embodiments where any one of the modules 51, 52 and 53 serves a limited function, the actual module function might be incorporated in the transfer control module 50. For example, if the only relevant event user was a time event, the transfer control module 50 might include that time monitoring function directly.

The configuration table 54, as previously indicated, might be formed as a separate table within the system manager 45 or as a modification to a standard table. For purposes of implementing this invention, the table 54 or any equivalent structure should contain a designation of a file or logical volume and its format size and location.

Further details of the various modules in the system manager 45 are not necessary to an understanding of this invention. The structure of such modules or the implementation of the equivalent functions in either the specifically disclosed or equivalent form is within the scope of persons of ordinary skill in the art.

Figure 3:
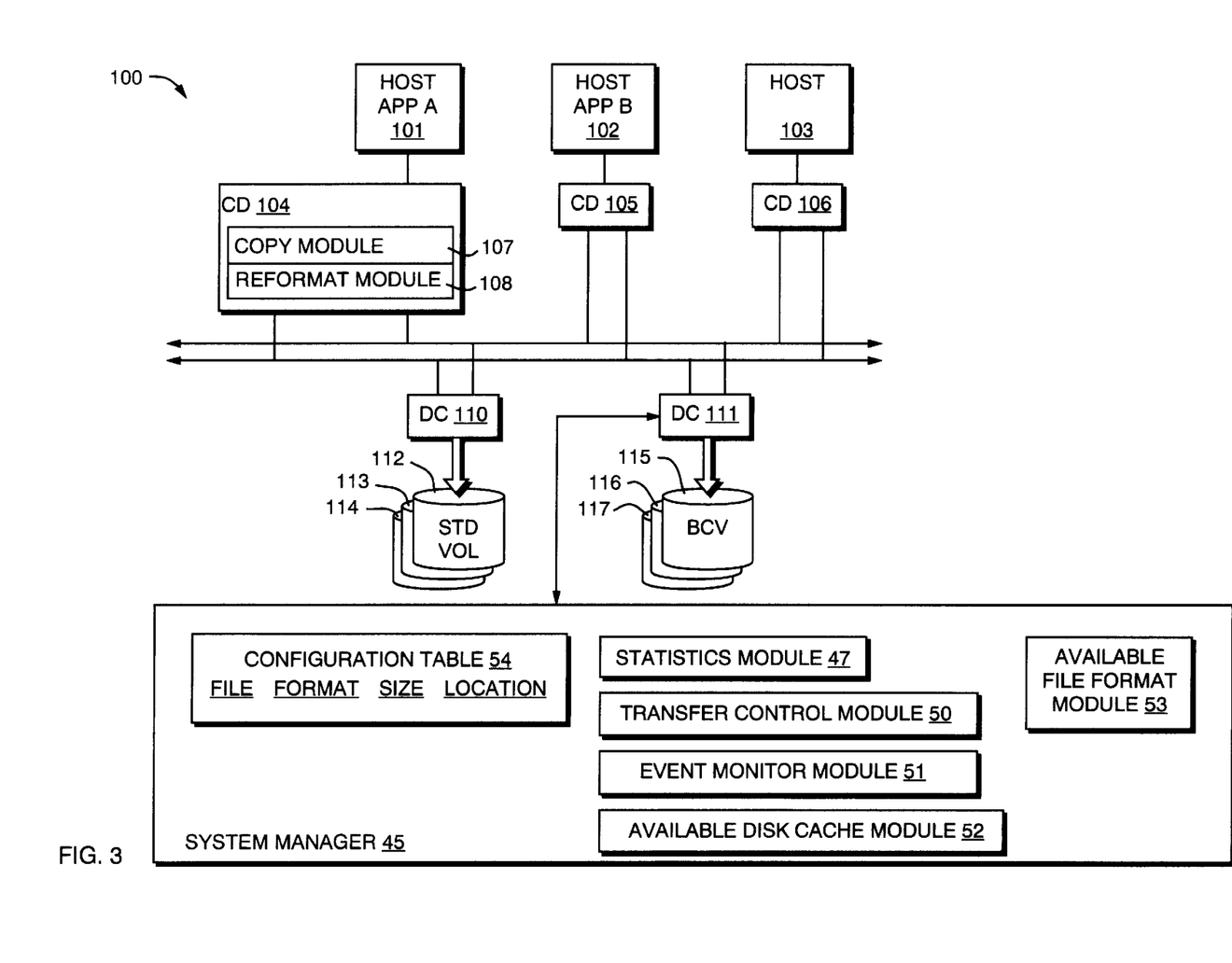
FIG. 3 depicts another embodiment of a data processing system incorporating this invention.

FIG. 3 depicts in a different form another embodiment of a digital data processing system 100 based upon the system of FIG. 2. Multiple host systems 101, 102 and 103 constitute shared, independent system resources. More specifically the host 101 could respond to one type of application, such as an application that runs optimally when its data is stored in a log structured file; host 102 to an application that runs optimally when its data is stored as a stripped file; and host 103, to some other application. Alternatively one host might respond to all these applications.

Each of the hosts 101 through 103 connects through a corresponding one of channel directors 104 through 106 in a storage system. The channel directors constitute one form of a host adapter that is particularly used in many mainframe applications. Other host adapters include ESCON or SCSI adapters. Such adapters are well known in the art. For purposes of this description the phrases "host adapter" and "channel directors" will be used interchangeably. However, it will be apparent that any other type of host adapter could be substituted for the specifically disclosed channel directors. For purpose of explanation it is assumed that each channel director will include, as depicted in the channel director 104, a copy module 107 and a reformat module 108. These modules are described later.

A bus system, typically a parallel bus network, interconnects the channel directors 104 through 106 with device controllers 110 and 111 that are analogous to the device controllers 40 and 42 in FIG. 1. In this particular embodiment, however, the device controller 110 controls the operations of a series of physical disks which are shown in terms of three logical volumes 112, 113 and 114. The segmentation of physical disks into logical volumes is well known in the art.

Similarly the device controller 111 interfaces another series of logical volumes 115, 116 and 117 to the bus 109. In accordance with this invention, each of these volumes 115 through 117 is defined as a Business Continuation Volume and is designated a BCV device. Each BCV device comprises a standard disk controller and related disk storage devices as shown in FIG. 2 especially configured to independently support applications and processes. As more fully described in U.S. patent application Ser. No. 08/842,953 these BCV devices normally enable a host, such as host 102 to utilize instantaneous copies of the data in the standard volumes through 114. Typically at least one BCV device is assigned to each host device that will operate on a data set concurrently.

In a typical operating mode a BCV device allows concurrent access to a single data set by the hosts 101 and 102, but allows the host 101 to continue processing without any impact or load on the resource 101 and the volumes 112 through 114. The resource load for performing other applications is transferred entirely to the host 102 and to one of the BCV devices 115 through 117. All of this is essentially transparent to the user.

As described in U.S. patent application Ser. No. 08/842,953, a configuration procedure establishes a configuration by which a host can issue a number of commands to establish a BCV device as a mirror, to split a BCV device as a mirror and reestablish a data transfer path with another application, to reestablish the BCV device as a mirror and to restore data from the BCV device when it operates as a mirror synchronized to other storage devices. The configuration will now be discussed in detail as they pertain to this invention.

Figure 4A:
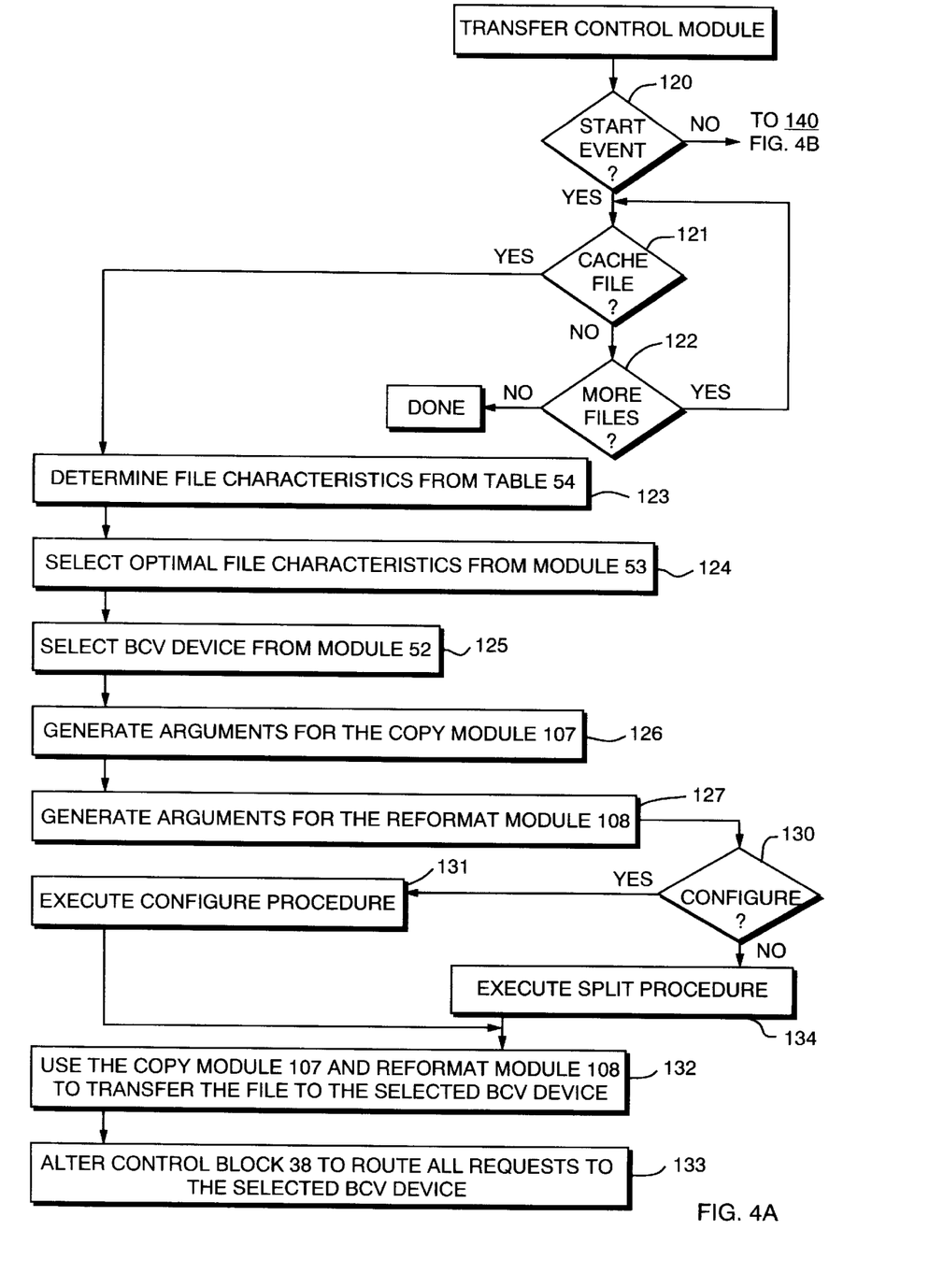
FIGS. 4A and 4B constitute a flow diagram depicting the operation of a transfer control module shown in FIG. 2 in the embodiment of FIG. 3.
Figure 4B:
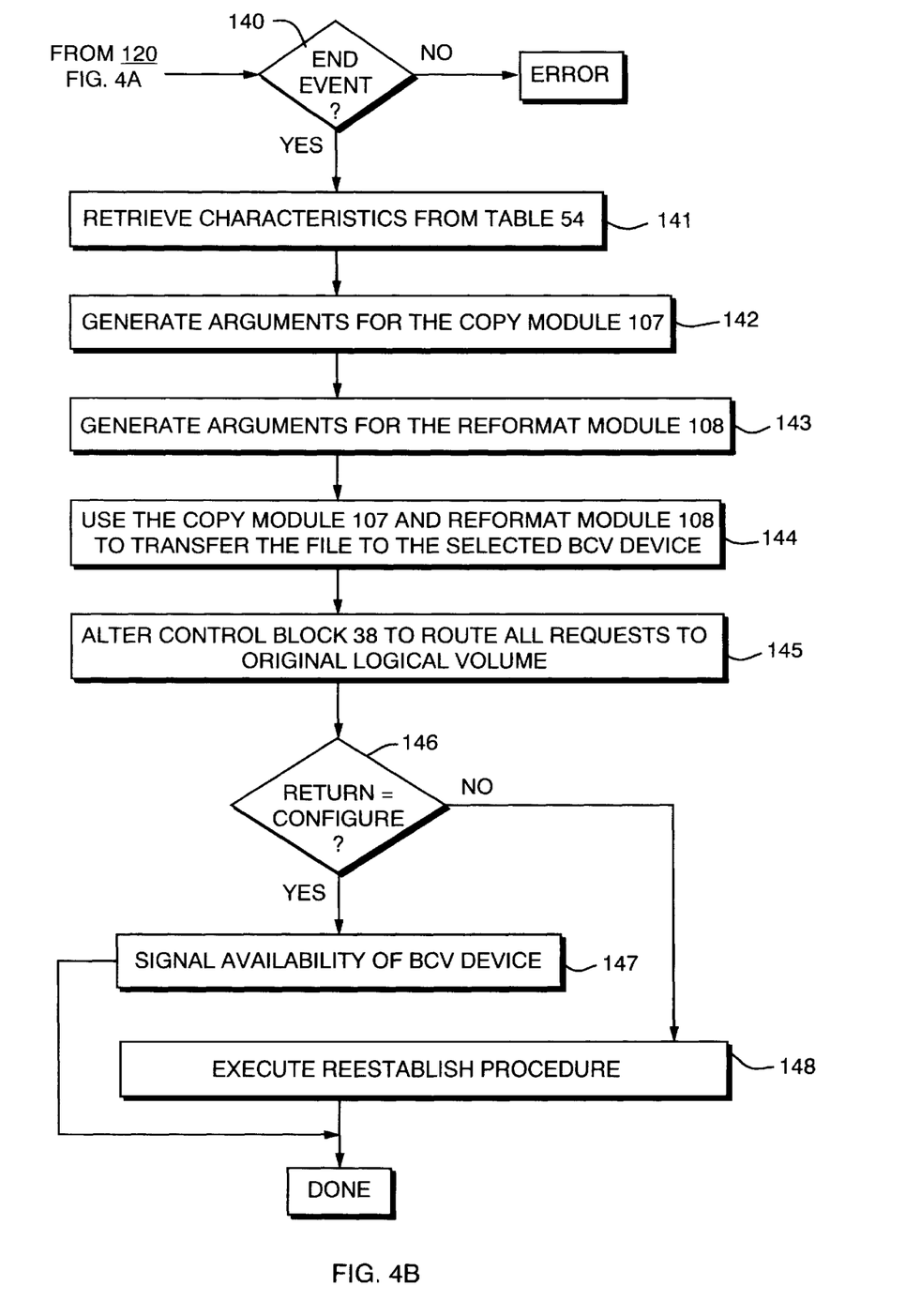

FIGS. 4A and 4B depict the method by which the transfer control module 50 in FIG. 3 performs a transfer. When the event monitor module 51 detects an event, step 120 determines whether the event defines the beginning or end of an interval. If the beginning, step 120 passes control to step 121 to determine whether the file, logical volume block or storage element is one allocated to be cached on the disk. That is, is this a file or logical volume that would benefit by being formatted to the cache volume? A list of such files or logical volumes may be implicitly contained in the configuration table 54 or may be formed as an explicit list. If the file is not to be transferred to the cache volume, control passes to step 122 to determine if more files need to be tested for that interval. If so, control passes back to step 121; otherwise no further action occurs.

If the file or logical volume could be transferred, the transfer control module 50 uses step 123 to retrieve information from the configuration table 54. This information identifies the particular file characteristics including format and size. Next the module 50 uses step 124 to select an optimal set of file characteristics from those contained in the available file format module 53. Step 125 utilizes the information in the available disk cache module 52 to select a location for the cache volume within the BCV devices 115 through 117 in FIG. 3.

With this information, the transfer control module 50 generates various arguments for controlling the transfer. In step 126, the arguments for controlling a copier module, such as copy module 107 in FIG. 3, are generated. These arguments include, among others, the source and destination of the file. Similarly, step 127 generates arguments for the reformat module 108 including, among others, the format of the file at the source and the desired format at the destination. Those arguments and the steps for developing those arguments from the various modules as shown in FIG. 3 are well known in the art.

As described in U.S. patent application Ser. No. 08/842,953, it is possible to attach a BCV device to an application by executing either a CONFIGURE command or a SPLIT command. The particular command will depend upon how the selected BCV device is used at other times. If the BCV device is used as a mirror, a SPLIT command can be used. Typically the system administration knows which is the preferable command.

Figure 5:
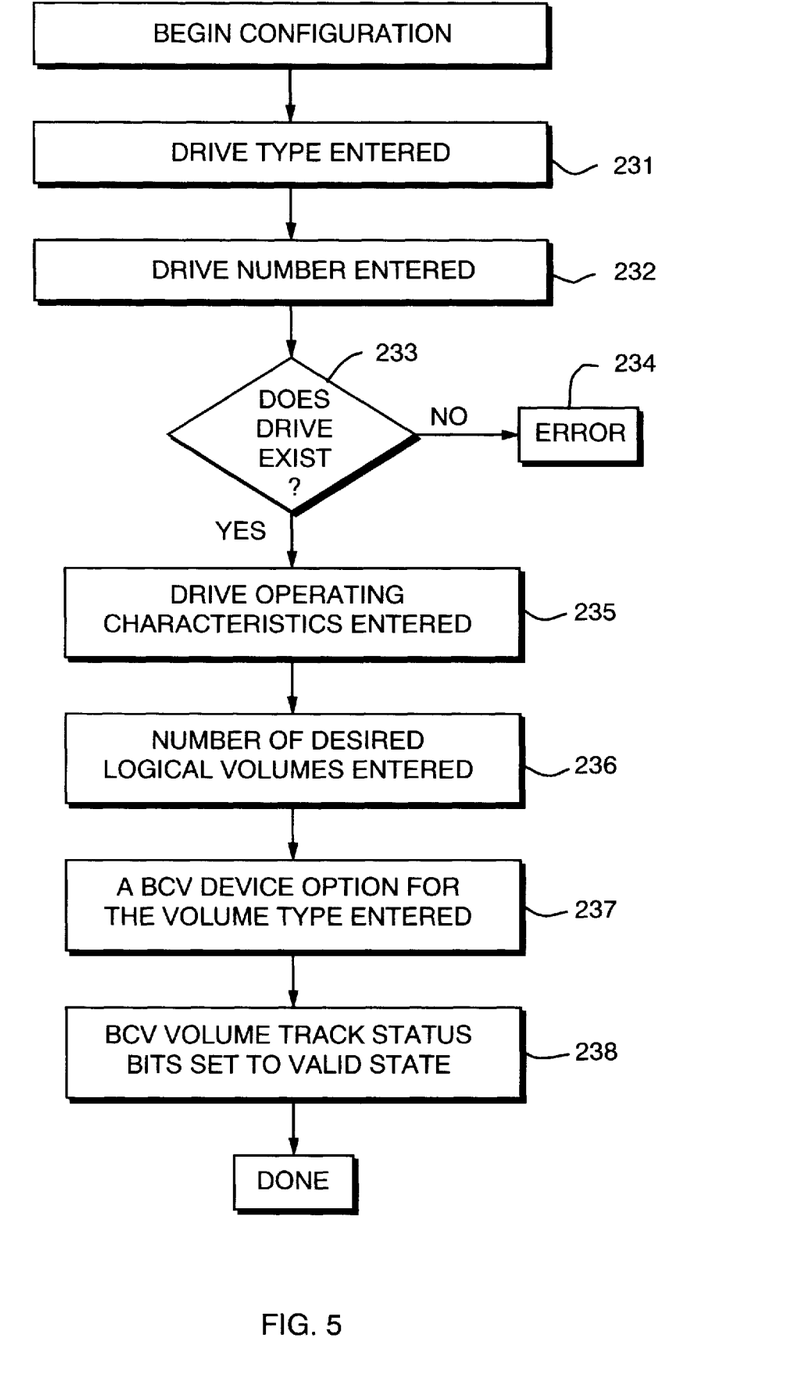
FIG. 5 is a flow diagram of a procedure used in FIG. 4.

If the CONFIGURE command is selected, step 130 diverts control to step 131 to execute that command as disclosed in FIG. 5. Then step 132 initiates the copy module 107 and reformat module 108 in FIG. 3 to transfer the selected file to the BCV device in its alternate format. As will be evident, this transfer constitutes a disk-to-disk transfer without any host intervention. Consequently, it will occur in an interval of minutes. When that operation is complete, step 133 alters the control block 38 in FIG. 2 to route all subsequent requests to the BCV device.

If the CONFIGURE command is not selected, control passes from step 130 to step 134 to execute the SPLIT command before initiating the copy and control functions of steps 132 and 133. The SPLIT command procedure is modified in the same way the CONFIGURE command procedure is modified, as described later.

Before the procedure of FIG. 4A begins, the corresponding logical volume, file, block or storage element containing data is located in one or more of the logical volumes 112 through 114 for processing by the APP A application program associated with the host 101. The format for that block may be a log structured format, a conventional non-stripped format or any other format. Once this procedure in FIG. 4A has been completed, further actions by the APP B application program in host 102 will involve the selected one of the BCV devices 115 through 117. It may also involve all the BCV devices if the alternate format for the APP B program is a stripped format. At this time, the logical volume in its original format can remain in its original logical volume. Thereafter the APP B application, shown with the host 102, operates with data in the alternate format, such as a stripped or non-stripped format, for the remainder of the interval.

Completion of any interval may be identified by an event sensed by the event monitor module 51 or an event that bears some time reference to the beginning of the interval. For example, if the system administrator determines the starting time for processing in the cache, the system administrator may also identify the time at which that processing completes. When the event occurs, decision block 120 in FIG. 4A recognizes the termination of the interval and transfers control to step 140 in FIG. 4B. If the event is not a start or end event, step 140 diverts to step 141 to generate an error message and terminate operation. When an end event occurs, step 140 directs to a procedure by which the transfer control module 50 transfers the file or logical volume from the selected BCV device to the original logical volume in its original format in a manner that is analogous to the transfer of FIG. 4A.

More specifically, step 141 retrieves the characteristics from the table 54 including the format of the file in its original location. Step 142 generates the arguments for controlling the copy module 107; step 143, the arguments for the reformat module 108. As will be apparent at the end of steps 142 and 143, the copy module will use the selected BCV device as the source and the original storage volume as the destination and the reformat module will be set to convert the format in the BCV device back to the original format in the original logical volume.

Once these arguments are generated, step 144 enables the copy module 107 and reformat module 108 in FIG. 3 to transfer the data in the altered format in the selected BCV device to the original volume in the original format, again in a matter of minutes. Next, in step 145 the contents of the control block, such as the control block 38, in FIG. 1 are altered so that all requests for the data set are routed to the original logical volume. Step 146 determines whether the original transfer of data utilized the configure command. If it did, step 147 disconnects the BCV device from the application program and signals the availability of the selected BCV device. If the selected BCV device had originally been a mirror of other devices, control would pass from step 146 to step 148 thereby to execute a reestablish procedure which, as described in U.S. patent application Ser. No. 08/842,953 would reconnect and resynchronize the selected BCV device to the logical volumes being mirrored prior to the event.

Thus, at the end of the procedure depicted in FIG. 4B, the logical volume, file, data block or storage element in the selected BCV device has data modified by the APP B application. That data has been reformatted and copied to the original one of the logical volumes 112 through 114. The selected BCV device has been made available for another connection or has been reestablished as a mirror in accordance with the procedures described in U.S. patent application Ser. No. 08/842,953. Consequently, when the APP A application issues I/O requests for data, the data will be formatted optimally for that application.

As previously indicated, at the beginning of an interval step 131 in FIG. 4A enables the CONFIGURE command to be processed. The process is essentially the same as described in the above-identified U.S. patent application Ser. No. 08/842,953 with the exception that the signalling of the readiness of the BCV device is delayed until after the data has been copied to the BCV device. FIG. 5 depicts the basic steps that underlie step 131 in FIG. 4A. More particularly, in FIG. 5 the procedure begins with the identification of the drive type and drive number in steps 231 and 232 thereby to identify a particular physical disk drive that will constitute the BCV device.

In whatever form, if the designated drive does not exist, a test at step 233 diverts to a process by which an appropriate error message is returned in step 234. Assuming the drive does exist, the user enters the drive operating characteristics in step 235 such as the number of cylinders, enters the number of desired volumes in step 236 and defines, as a volume type, a BCV device. Step 238 sets BCV device track status bits in its corresponding track status block to a valid state. When the procedure in FIG. 5 is completed, control passes back to step 132 in FIG. 4A.

As will now be apparent, this invention allows a reconfiguration of a file in a manner that is completely transparent to the user or any application program being processed by the host system 31 in FIG. 2 or any of the host systems 103 through 113 of FIG. 3. Moreover, the capability of reconfiguring the system in accordance with this invention is accomplished without any modification to any host system application programs as the entire process is controlled through the storage system manager 45, such as the storage system manager in the Symmetrix Series 5500 magnetic disk storage systems or equivalent internal control for other magnetic disk storage systems.

In essence this invention provides a system administrator with a powerful tool for enhancing the utilization of memory resources. Specifically a system administrator can recognize that a particular application may manipulate data in two or more discrete formats. For example, the system administrator may recognize that during certain intervals of time transfer requests may identify random locations whereas in other periods of time transfer requests may identify locations in sequence. In such a situation the system administrator can elect a file format that optimizes performance for random accesses. When the time is appropriate, the file is copied to the cache volume in a format that optimizes sequential accesses for the interval during which the system benefit from sequential access is optimal.

When the invention is applied, it can markedly improve the overall performance and thereby better utilize the resources provided a magnetic disk storage system. Typically such improved resources are evidenced as improved response times for the application programs, particularly on-line transaction programs that a host system may be processing.

This invention has been disclosed in terms of a specific embodiment in the form of a magnetic disk storage system available from the assignee of this application. It will be apparent, however, that this invention can be applied to other magnetic disk storage systems or even to other storage systems where the formatting of data can have a marked effect on the performance of that storage medium. For example, systems may utilize many types of random access memory having different retrieval times that represent different performance levels. Such a system as is disclosed in this embodiment can be readily adapted for performing an equivalent function in such random access storage. This invention has also been described in terms of particular modules and particular processing steps. As indicated, the equivalent functions of individual modules may be incorporated in the main control. The sequencing of steps and the elimination of some or addition of others steps to the method shown in FIG. 3 can also be made while still attaining some or all of the objects and advantages of this invention. Therefore, it is the intent of the appended claims to cover all such variations and modifications as come within the true spirit and scope of this invention.

What is claimed as new and desired to be secured by Letters Patent of the United States is:

1. A method for improving the performance of a disk storage device that stores data in a first data block of according to a first of a plurality of possible file formats and that operates in response to data transfer requests, said method comprising the steps of:
   A) establishing a second data block in the disk storage device for storing data;
   B) determining conditions when it is desirable to process the data in the first data block according to a second of a plurality of formats;
   C) copying the data in the first file format from the first data block to the second data block in the second file format; and
   D) redirecting further data transfer requests from an application for data in the first data block to the second data block.

2. A method as recited in claim 1 wherein said condition determining step includes monitoring the operations of the storage device to determine a time interval during which the conditions will exist.

3. A method as recited in claim 2 wherein said operations monitoring includes compiling read and write disk access statistics for each file as a function of time.

4. A method as recited in claim 1 wherein said copying includes:
   i) utilizing a concurrent copy procedure for copying the data block according to predetermined arguments, and
   ii) establishing the argument values.

5. A method as recited in claim 1 comprising the additional steps of:
   A) transferring the data in the second file format from the second data block to the first data block in the first file format; and B) thereafter redirecting further data transfer requests from an application to the first data block.

6. In a data processing system with a first data block in a data storage system for the storage of data in a first of a plurality of possible file formats and that operates in response to data transfer requests from at least one application directed to the first data block, means for improving the performance of the data storage system comprising:
- A) means for establishing a second data block;
- B) means for determining conditions when it is desirable to process the data in the first data block according to a second of the plurality of the formats;
- C) means for copying the data in the first format from the first data block to the second data block in the second format; and
- D) means for redirecting further data transfer requests from an application for data in the first data block to the second data block.

7. A system as recited in claim 6 wherein said condition determining means includes means for monitoring the operations of the storage device to determine a time interval during which the conditions will exist.

8. A system as recited in claim 7 wherein said operations monitoring means includes means for compiling read and write disk access statistics for each file as a function of time.

9. A system as recited in claim 8 wherein said copying means includes:
- i) concurrent copy means for copying the data block according to predetermined arguments, and
- ii) means for establishing the argument values.

10. A system as recited in claim 6 wherein said copying means includes:
- i) concurrent copy means for copying a data block according to predetermined arguments, and
- ii) means for establishing the argument values for transferring the data between the first and second data blocks.

11. A data processing system comprising:
- A) a first storage element of a given medium configured to store data according to a first format;
- B) a second storage element of the given medium having storage adapted to be configured according to a second format; and
- C) a storage element manager that responds to a predetermined event by transferring data from said first storage element to said second storage element to be stored in the second format and thereafter directs data transfer requests to said second storage element.

12. A system as recited in claim 11 wherein said storage element manager includes:
- i) means for determining an interval during which data should be processed in the second format, and
- ii) means for transferring the data from the first storage element to the second storage element at the beginning of the predetermined interval and from the second storage element to the first storage element at the end of the predetermined interval.

13. A method for improving the performance of a data processing system comprising a first storage element of a given medium configured to store data according to a first file format, the data in the first storage element being accessible to at least one application, said method comprising the steps of:
- A) establishing a second storage element of the given medium having storage adapted to be configured according to a second format;
- B) responding to a predetermined event by transferring data from the first storage element to said second storage element to be stored in the second format; and
- C) enabling an application to interact with the data in the second storage element and disabling access to the data in the first storage element.

14. A method as recited in claim 13 wherein said responding step includes:
- i) determining an interval during which data should be processed in the second format, and
- ii) transferring the data from the first storage element to the second storage element at the beginning of the predetermined interval and from the second storage element to the first storage element at the end of the predetermined interval.

15. A method for improving the performance of a magnetic disk storage system that stores data in logical volumes including a first logical volume of a predetermined size with a first of a plurality of possible formats and that operates in response to data transfer requests, said method comprising the steps of:
- A) establishing a second logical volume block of at least the predetermined size for storing data;
- B) determining conditions when it is desirable to process the data in the first logical volume according to a second format;
- C) copying the data in the first format from the first logical volume to the second logical volume in the second format concurrently with transfer requests to the first logical volume; and
- D) redirecting further data transfer requests to the second logical volume.

16. A method as recited in claim 15 wherein said condition determining step includes monitoring the operations of the transfers with the first logical volumes to determine a time interval during which the conditions will exist.

17. A method as recited in claim 16 wherein said operations monitoring includes compiling read and write disk access statistics for the first logical volume as a function of time.

18. A method as recited in claim 15 wherein said concurrent copying includes:
- i) utilizing a concurrent copy procedure for copying a logical volume according to predetermined arguments, and
- ii) establishing the argument values.

19. A method as recited in claim 15 comprising the additional steps of:
- A) transferring the data in the second format from the second logical volume to the first logical volume in the first format; and
- B) thereafter redirecting further data transfer requests to the first logical volume.

20. In a data processing system with a magnetic disk storage system that stores data in logical volumes including a first logical volume of a predetermined size with a first of a plurality of possible formats and that operates in response to data transfer requests, means for improving the performance comprising:
- A) means for establishing a second logical volume block of at least the predetermined size for storing data;
- B) means for determining conditions when it is desirable to process the data in the first logical volume according to a second format;
- C) means for concurrently copying the data in the first format from the first logical volume to the second logical volume in the second format concurrently with transfer requests to the first logical volume; and D) means for redirecting further data transfer requests to the second logical volume.

21. A system as recited in claim 20 wherein said condition determining means includes means for monitoring the operations of the first logical volume to determine a time interval during which the conditions will exist.

22. A system as recited in claim 21 wherein said monitoring means includes means for compiling read and write disk access statistics for the first logical volume as a function of time.

23. A system as recited in claim 20 wherein said copying means includes:

i) a concurrent copy module for copying a logical volume according to predetermined arguments, and ii) means for establishing the argument values.

24. A system as recited in claim 20 wherein said copying means includes:

i) a concurrent copy means for copying a logical volume according to predetermined arguments, and ii) means for establishing the argument values for transferring the data between the first and second logical volume.

* * * * *

UNITED STATES PATENT AND TRADEMARK OFFICE
CERTIFICATE OF CORRECTION

PATENT NO : 6,122,685
DATED : September 19, 2000
INVENTOR(S): Eitan Bachmat

It is certified that error appears in the above-identified patent and that said Letters Patent are hereby corrected as shown below:

<u>IN THE TITLE</u>

After "SYSTEM" insert -- AND METHOD --

Signed and Sealed this

Twenty-fourth Day of April, 2001

Attest:

NICHOLAS P. GODICI

Attesting Officer     Acting Director of the United States Patent and Trademark Office